June 29, 1937.  F. P. LACKINGER  2,085,665
GEAR SHIFTING MECHANISM
Filed June 1, 1932  4 Sheets-Sheet 1

INVENTOR
F. P. Lackinger
by F. N. Barker
Attorney

June 29, 1937.  F. P. LACKINGER  2,085,665
GEAR SHIFTING MECHANISM
Filed June 1, 1932    4 Sheets-Sheet 2

June 29, 1937.  F. P. LACKINGER  2,085,665

GEAR SHIFTING MECHANISM

Filed June 1, 1932 4 Sheets-Sheet 3

INVENTOR
F. P. Lackinger
by F. N. Barber
Attorney

June 29, 1937.　　　　F. P. LACKINGER　　　　2,085,665

GEAR SHIFTING MECHANISM

Filed June 1, 1932　　　　4 Sheets-Sheet 4

INVENTOR
F. P. Lackinger
by F. N. Barker
attorney

Patented June 29, 1937

2,085,665

UNITED STATES PATENT OFFICE 2,085,665

GEAR SHIFTING MECHANISM

Frank P. Lackinger, McKees Rocks, Pa.

Application June 1, 1932, Serial No. 614,665

9 Claims. (Cl. 74—334)

My invention relates to gear-shifting mechanism designed particularly for automobiles, but it is applicable to other types of apparatus besides automobiles.

It is one object of my invention to provide a gear-shifting mechanism whose gears are shifted by the depression of the clutch pedal. Another object is to provide means for shifting progressively from neutral into low and then into intermediate and high and thence, if desired, back into intermediate and again into high and so on, but the gears cannot be progressively shifted back to low. I provide also for the progressive shifting from neutral into reverse and low. I also provide for the shifting of the gears into low, which I call independent low, from which the gears can not be shifted except into neutral unless certain selecting devices are moved to a certain position. I also provide for shifting the gears into reverse, which I call independent reverse, from which the gears cannot be shifted except into neutral unless the said selecting devices are reset for a different sequence of operations. Other objects relate to details which will be best understood after they have been described.

Referring to the accompanying drawings.

On the drawings, 1 designates a horizontal metal base-plate adapted to form the cover of a gear-transmission case and a support for the other parts of the mechanism constituting this invention. It has the two parallel slots 2 and 3 extending entirely through the thickness thereof. A bar 4 is slidable longitudinally in the slot 2 and has a portion above the base-plate 1 and a portion below the same, the latter portion having rigidly therewith the gear-shifting fork 5 for shifting the gears into neutral, intermediate, and high. The gearing for such shifting is well known and I have indicated its presence merely by dotted lines at 6 where only one gear wheel is shown. The bar 7 slides lengthwise in the slot 3 and has portions above and below the base-plate, the part below the base-plate being rigid with the gear-shifting fork 8 for shifting other gears into neutral, low, and reverse. The latter gears are indicated merely by the presence of the gear 9.

The bar 4 has secured to its inner face the angle plates 10 and 11 respectively slidable on the upper and lower faces of the base-plate 1 to support and guide the bar 4. Similar angle plates 12 and 13 are attached to the inner face of the bar 7, these plates being slidable on the respective upper and lower faces of the base-plate 1 to support and guide the bar 7. The end of the bar 4 is provided with a pin having the head 14 slidable on the lower face of the base-plate to prevent the bar 4 from upward movement. A portion of the outer face of the bar 4 is guided by the angle plate 15 secured to the upper face of the base-plate.

16 is a horizontal lever having one end pivoted on the pin 17 in the upper edge of the bar 7, while the other end of the lever lies loosely in the notch 19 in the upper edge of the bar 4. 20 is a horizontal link or pitman which carries the vertical pivot pin 21 which extends down through the lever 16 and pivotally connects one end of the pitman to the intermediate portion of the lever 16.

22 is a turret resting on the upper face of the base 1 and rotatable about a vertical axial center. It has the cylindrical lower portion 23 which turns in a corresponding opening 24 in the horizontal block 25 secured in any desired manner to the upper face of the base 1, the extreme lower end of the turret having the annular flange 26 turning in a corresponding undercut groove in the bottom of the block for holding the turret in the position described. The upper end of the turret has rigid therewith on its upper face the two upstanding cylindrical studs or crank-pins 27 and 28 at opposite sides of the axial center line of the turret, the upper ends of the studs having, integral therewith, the upstanding oblong lugs 29 and 30 whose lengths are equal to the diameters of the studs and whose ends are rounded so as to be flush with the peripheries of the studs. The sides of the lugs are made by cutting away the opposite sides of the studs so as to form horizontal shoulders 31, the flat vertical sides of the lugs above the shoulders being between imaginary parallel vertical planes at opposite sides of the axial center line of the turret.

The turret is rotatable clockwise or to the right. It has the peripheral groove 32 above the cylindrical part 23 whereby the horizontal flange 33 is left at the upper end thereof. Pins 34, 35, 36 and 37 extend through the flange 33 and across the groove 32 and into the cylindrical part 23. The flange 33 is recessed between the pins 34 and 35 to form a clearance for the lug 133' on the pawl 56 to be described hereinafter. The clearance has two faces 38 and 39. The face 38 begins at the left laterally beyond the pin 34 and extends inwardly and toward the right. It merges at its right-hand end into the outwardly extending face 39 which curves up to the left of the pin 35 and connects with the arc-shaped periphery or cam surface of the flange 33 between the pins 35 and 36.

The flange 33 is cut away between the pins 36 and 37 diametrically opposite the cut away portion thereof which is between the pins 34 and 35, so as to form a second clearance for the lug 133'. This clearance is defined by the faces 40 and 41 which correspond respectively to the faces 38 and 39. The pins 34 to 37 are arranged at the corners of an imaginary square.

42 is a horizontal bell-crank lever pivoted on the pivot 43 and having the arm 44 arranged to engage simultaneously any two consecutive ones of the pins 34 to 37 so as to cause the turret 22 to come to rest at any one of the four positions determined by which pair of the pins 34 to 37 is engaged by the arm. The remaining arm 45 of the horizontal lever 42 is connected to one end of the spring 46, the other end being attached to the lever 47 pivoted on the pin 48 carried by the base 1.

49 is a bell-crank lever fulcrumed on the pivot 50 mounted on the supplemental base 51 bolted to the base 1. The long arm 52 of the lever 49 extends diagonally outwardly and terminates somewhat beyond the turret 22 and at the right thereof. The outer end of the arm 52 carries the pins 53 and 54 to which the respective pawls 55 and 56 lying across the upper face of the rear portion of the base 1 are pivoted, the pawl 56 lying between the pawl 55 and the turret 22. The outer edge of the pawl 56 is in sliding contact with the inner edge of the pawl 55. The end of the lever 47 not carried by the pin 48 engages the outer edge of the pawl 55 so that due to the spring 46 the lever 47 will yieldingly press the inner edge of the pawl against one of the pins 34 to 37 that stands opposite the pawl 56 and adjacent thereto.

The remaining arm 59 of the bell-crank lever 49 is provided with the swivel connection 60 pivoted to the arm by the pin 61. The free end of the swivel is connected in any preferred manner to the clutch pedal 62 so that when the latter is pressed a predetermined distance, it will swing the bell-crank lever 49 clockwise and cause one or both of the hooks 57 and 58 to engage certain ones of the ratchet pins 34, 35, 36 and 37 and cause the turret to rotate, as will be explained.

The pedal 62 may be pivoted at its lower end as at 63 while the link 64 connects the swivel 60 to the pivot 65 intermediate of the ends of the pedal. When the pedal is pressed forwardly, that is toward the bottom of Fig. 19, the link 64 causes the bell-crank lever 49 to rock clockwise. The lever 49 is caused to return or rock anticlockwise by the usual clutch pedal spring 66.

Figure 2:
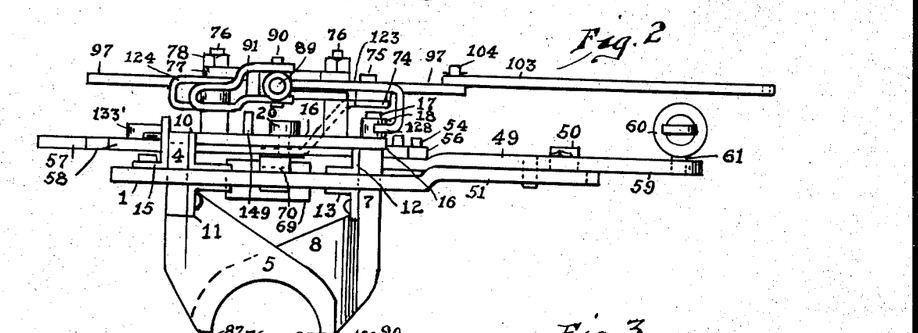
Fig. 2 is an end elevation of Fig. 1.
Figure 3:
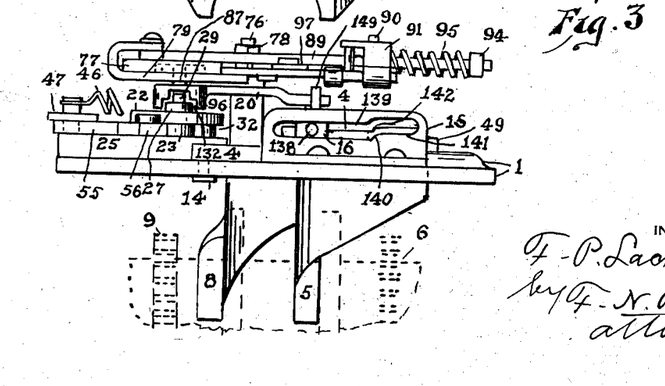
Fig. 3 is a side elevation of Figs. 1 and 2, parts being omitted.
Figure 4:
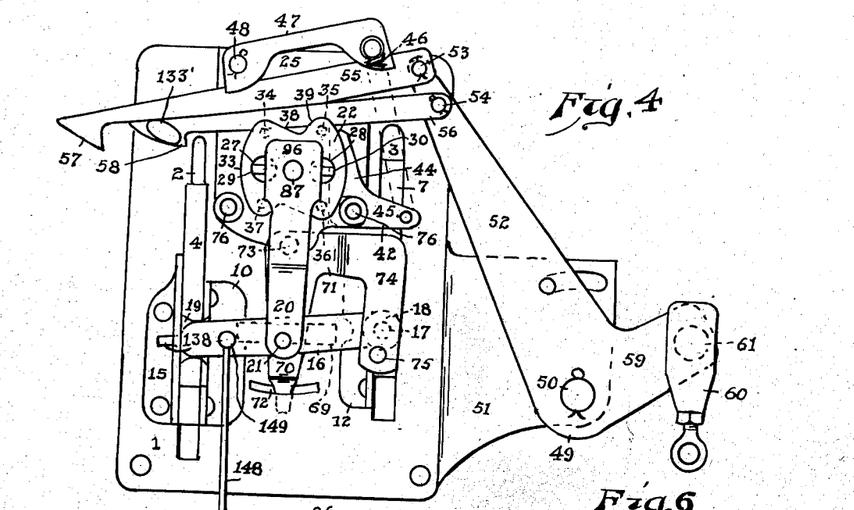
Fig. 4 is a plan view of my invention with the plate 77 and the mechanism which it carries removed.
Figure 20:
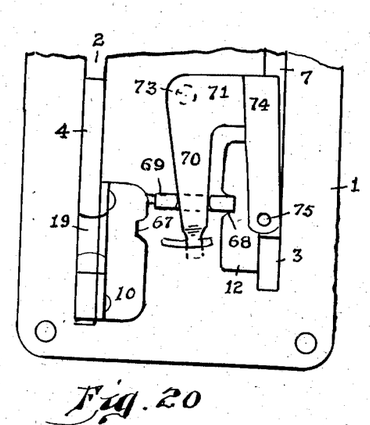
Fig. 20 is a fragmentary plan view showing the means for operating the locking mechanism for the gear-shifting bars.

The horizontal edges of the angle plates 10 and 12 have the locking notches 67 and 68 which are directly opposite each other when the bars 4 and 7 are as shown in Fig. 4 where they are set for holding the gears in neutral. The horizontal locking bar 69 is arranged at right angles to the adjacent edges of the angle plates 10 and 12 and is operated by the arm 70 of the U-shaped lever 71. This arm on which the lower end of the pivot 21 rests lies in a notch in the upper face of the locking bar 69. The arm 70 lies beneath the pitman and has a tongue 70' which extends through the slot 72 in the base 1 and rides on the under side of the base. The lever 71 is pivoted on the pin 73. The other arm 74 of the lever 71 extends upwardly and then laterally as shown in Figs. 2 and 20, and then forwardly or toward the lower end of Fig. 4, parallel with the arm 70. The arm 74 has the upstanding pin or pivot 75.

There are two vertical bolts 76 standing up rigid with the base 1. A plate 77 parallel with the base 1 and above it is secured on the bolts by the nuts 78. A lever 79 has at its forward end the notch or fork 80 normally seated on the stud 81 pendent from the plate 77. The lever 79 carries two studs or pins 82 and 83 which project up into the slots 84 and 85 respectively in the plate 77. The lever has longitudinally thereof the slot 86 in which the pin or pivot 87 on the upper face of the pitman rides. The end of the lever 79 opposite the fork 80 is turned into a hook-like member 88 which overlies the plate 77 whose adjacent end is arc-shaped to correspond to the arc-movements of the member 88. The end of the member 88 has pivoted thereto one end of the rod 89 which lies over the plate 77 and extends through the pivot 90 which has its bearings in the sides of the U-shaped member 91 pivoted on the pin 92 in the narrow extension 93 on the end of the plate opposite its arc-shaped end. The rod 89 continues past the pivot 90 and terminates with the nut 94, there being a helical spring 95 around the rod between the pivot 90 and the nut 94 to provide a constant pull on the rod 89 and the lever 79 in order to cause the lever to be automatically moved to one limit or the other after it passes its central position. The mechanism just described forms an automatic over-throw device to shift the lever 79 and, accordingly, the pitman 20 laterally so that the end 96 of the pitman carrying the pin 87 may be thrown so as to lie over either the stud 27 or the stud 28.

A horizontal longitudinally slidable selector 97 having the longitudinal slot 98 is guided transversely of the base 1 by the headed studs 99 positioned in the slot and carried by the plate 77. The selector 97 has at its ends and facing the pins 82 and 83 the two clearances 100 and 101 for the said pins, these rests each being long enough to clear both pins at once, at which time they allow the lever to rest on the pin 81. They are alined with each other and are shown at right angles with the bars 4 and 7. A rest 102 is carried by the selector 97 between the clearances 100 and 101. It is on the edge of the selector facing the pins 82 and 83 and is sufficiently long to accommodate both pins at the same time, as shown on Fig. 1.

The selector 97 is slid longitudinally by the link 103 which has one end pivoted to the selector at 104 and the other end to one arm of the bell-crank lever 105 pivoted at 106. The other arm of the lever 105 is pivoted to the link 107 which is pivoted to one arm of the bell-crank lever 108 pivoted at 109, the other arm being pivoted at 110 to the arm 111 carried by the rod 112 arranged axially in the steering post 113. A pointer 116 is carried by the rod 112 over the steering wheel 115. The pointer sweeps over the indicator 117 on the steering wheel. 118, 119, 120, 121 and 122 show on the indicator 116 the positions of the pointer when the mechanism is set for the shifting of the gears as hereinafter specified.

A longitudinally-sliding lever 123 lies adjacent to the forward end of the plate 77 and has at one end the hook 124 which embraces the extension 93. The lever has the pendent pin 130 which is arranged to slide in contact with the forward edge 125 of the plate 77 and acts as a pivot for the lever at certain times. The lever lies at that side of the selector 97 which faces the member 91. It has the lug 126 which is carried by the hooked end 124, the lug lying in the plane of the selector and rearwardly thereof.

The lever 123 has a slot 127 for the pin 75. The end of the lever 123 adjacent to the pin 75 turns downwardly and then inwardly, the inner end having the cam 128 which may stand in the path of the roller 18 when the bar 7 moves forwardly toward the lower end of Fig. 1.

The member 91 has the vertical pin 129 on which the edge of the lever 123 rests, the spring 95 acting on the member 91 to urge the lever 123 toward the selector 97 and press the pin 130 on the lever 123 against the adjacent edge 125 of the plate 77.

The lower face of the end 96 of the pitman 20 has the transverse recess or groove 132 whose width is such as to receive either stud 27 or 28 between its sides. The upper end of the slot has the four pendent bosses or lugs 133 whose height is about equal to the height of the lugs 29 and 30. The lugs 133 are at the corners of an imaginary rectangle and provide recesses 134 and 135 into which a selected one of the lugs 29 and 30 may enter to prevent the pitman from lateral movement independently of that lug. As the pitman swings on its pivot 21, its groove may enclose either stud 27 or 28, or the link may occupy a central position in which both studs are partially within the groove 132, so that the turret is then locked from rotation.

Figure 1:
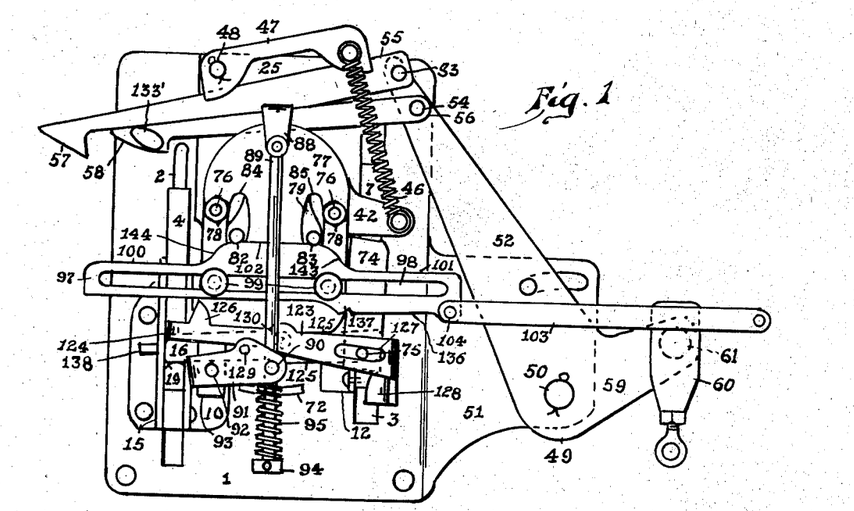
Fig. 1 is a plan view of my invention, parts being omitted.
Figures 5, 6, 7, 8:
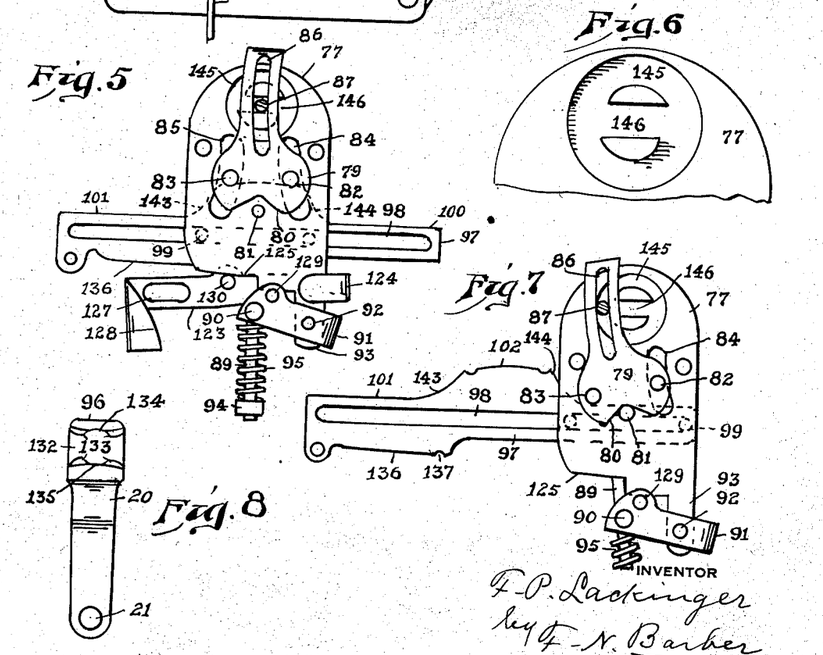
Fig. 5 is a bottom plan view of the plate 77 together with the mechanism carried thereby.
Fig. 6 is a detail view showing the rear end of the plate 77 with certain slots therein.
Fig. 7 is a view corresponding to Fig. 5 with the parts in different positions.
Fig. 8 is a bottom plan view of the pitman 20.
Figure 9:
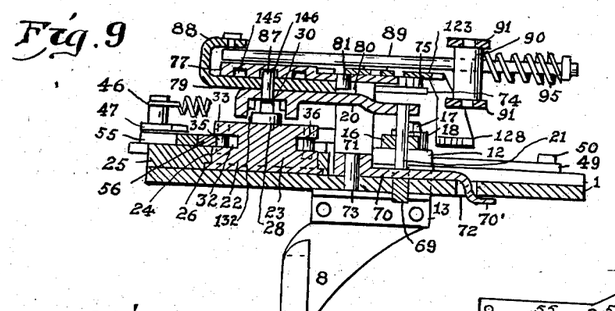
Fig. 9 is a vertical section through the central portion of my mechanism.

Figs. 1, 4, and 5 show the positions of the parts of the mechanism when in locked neutral, the bars 4 and 7 being in their central positions, the locking bar 69 being engaged in the locking notch 67 for the bar 4, due to the rearward pressure exerted by the spring 95 on the pin 129, which pressure rocks the lever 123 clockwise on its pivot 130 and causes the U-shaped lever to rock clockwise, its arm 70 shoving the locking bar 69 into the notch 67. The pointer having been moved to the indication 120 as shown on Fig. 19, the selector 97 was moved to its central position shown on Figs. 1, 4, and 5, whereupon the rest 102 on the selector engaged the pins 82 and 83 and pushed the lever 79 rearwardly, the pins both being supported by that rest against which they are urged by the spring 95 acting through the rod 89. The parts of the mechanism are now in locked neutral position as shown. The turret is locked by the pitman, and the pitman is locked by the pin 87 in the slot 86 of the lever 79. The lever 79 is locked because both pins 82 and 83 are supported at opposite sides of its center by the rest 102.

In order to set the mechanism so that it can be progressively thrown into low, intermediate, and high, the pointer 116 is moved to the indication 118 for high whereby the selector 97 is pushed so as to bring the clearance 101 opposite the pins 82 and 83. As the pin 83 slides from the rest 102 to the clearance 101 during this movement, the overthrow lever 79 is swung clockwise by the action of the spring 95 which swings the pitman 20 from its central position so that its groove 132 centrally embraces the stud 28. At this time the fork-carrying bars 4 and 7 are in their central or neutral positions as shown in Fig. 1. The locking bar 69 is in the notch 67 and locks the bar 4, preventing the throwing of the gears into intermediate and high.

Figure 10:
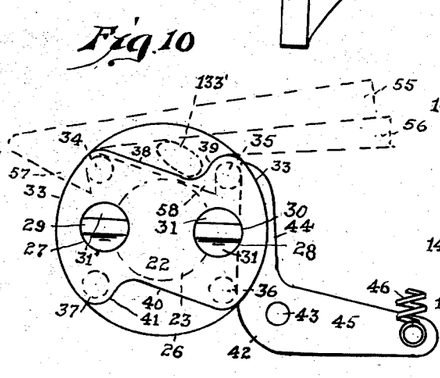
Fig. 10 is a plan view of the turret 22 and of the operating pawls 55 and 56 therefor together with the lever 42.

If now the pedal 62 is pushed down, the bell-crank lever 49 will be swung clockwise pulling the pawls 55 and 56 to the right. The hook 58 will not engage the ratchet pin 34 because the lug 133' on the upper side of the hook 58 engages the flange 33 and forces the pawls outwardly against the pressure of the spring 46. The hook 58 passes over the pin 34 and its lug 133 slides down in the clearance, as shown in Fig. 10. As the hook 58 moves inwardly, the pawl 55 moves to the position shown in Fig. 10. Continued pressure on the pedal causes the hook 57 to engage the pin 34 and rotate the turret 22 90°, so that the lugs 29 and 30 will stand at right angles to their starting positions, shown in Fig. 10. As the turret turns, the stud 28 and the lug 30 turn in the center of the groove 132 in the pitman 20 until the lug 30 is in the recesses 134 and 135 where the stud 28 is locked in the link and cannot escape to the right or left. As the stud 28 rotated clockwise it pushed the pitman 20 along with it, the pitman 20 acting on the lever 16 to move the end connected to the bar 7 toward the lower end of Fig. 4 or the forward end of the base 1. The end of the lever 16 connected with the bar 4 becomes the pivot on which the lever 16 turns.

When the turret 22 has turned as explained above, the parts are as in Figs. 11 and 12, the bar 7 coming to rest at the forward end of the slot 3.

Figure 18:
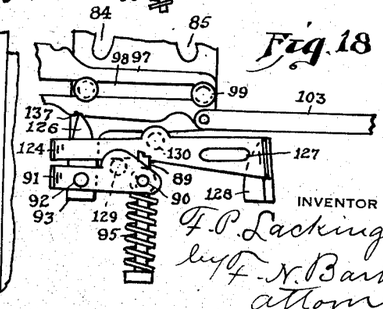
Fig. 18 is a fragmentary plan view showing the relative position of the selector 97 with respect to certain parts cooperating therewith.

This mechanism is now set in low: When the bar 7 is moved as just described, the roller 18 engages the cam 128 on the lever 123 which is slid thereby to the right so that the lug 126 rides upon onto the rest 136 on the opposite side of the slot 98 from the clearance 101, as shown in Fig. 18. The lug is now seated in a notch 137 in the rest 136 to hold the selector 97 and the lever 123 in the position shown. The lug 126 now becomes the fulcrum of the lever 123 so that the pressure of the spring 95 is transmitted to the lever 123 through the pin 129 which is between the lug or fulcrum 126 and the pivot 75 between the levers 71 and 123. Pressure is now exerted on the lever 71 tending to rock it anticlockwise and cause the locking bar 69 to be pulled out of the notch 67 and pushed into the notch 68. However, the bar 69 is not yet opposite the notch 68. The pitman 20 is in its central position which through the pin 87 and the slot 86 causes the lever 79 and the rod 89 to be in their intermediate positions.

When the pedal 62 is released the lever 49 will turn anticlockwise and come to rest as shown in Figs. 1 and 4.

Figure 21:
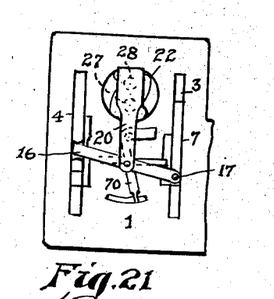
Fig. 21 is a diagrammatic plan view showing the operative connections between the turret 22 and the gear-shifting bars 4 and 7.

If now the pedal be again pressed down, the hook 58 first engages the rachet pin 37 which now occupies the position taken by the pin 34 in Fig. 10 and rotates the turret 22 90° which reverses the positions of the studs 27 and 28 from the positions shown in Fig. 10, at which time the bars 4 and 7 are in their central or neutral positions, and the notch 68 is opposite the locking bar 69, which under the pressure of the spring 95, which had its tension increased when the lug 126 rode to the rest 136, forces the lever 71 to rotate anticlockwise, which pushes the locking bar 69 into the notch 68, thereby locking the bar 7 in its central or neutral position. After the hook 58 has operated as described, the continued pressure of the pedal brings the hook 57 into engagement with the ratchet pin 36 which now occupies the position of the pin 34 in Fig. 10. The hook 57 rotates the turret another 90°, the pin 36 then taking the place of the pin 35 in Fig. 10. This movement of the turret 22 causes the stud 28 to pull the pitman 20 rearwardly. The pitman acting on the lever 16 which now has its fulcrum on the pin 17 pulls the bar 4 to the rear end of the slot 2, thus throwing the mechanism into intermediate, as shown in Fig. 21. The pitman 20 and the overthrow rod 89 are in their intermediate positions.

Upon operating the pedal again the hook 58 engages the ratchet pin 35 and rotates the turret 22 90° to the position shown in Fig. 10, where the turret is in the position in which it was assumed to be when the description of the operation of this invention was begun. The mechanism is now in neutral ready to be shifted into high by the completion of the stroke of the pedal, whereby the hook 57 engages the pin 34 and rotates the turret another 90° which causes the stud 28 to push the pitman 20 forwardly, the pitman acting to rock the lever 16 on its pivot 17 and move the bar 4 forwardly to the end of the slot 2. The apparatus is now thrown into high, the parts being as shown in Figs. 15 to 18.

The bar 4 does not travel so far when throwing the fork into high as the bars 4 and 7 travel when throwing the forks into intermediate. As the lever 16 is given the same travel by the action of the studs 27 and 28 whether the mechanism goes into high or intermediate, I provide the lever 16 with a pin 138 projecting horizontally beyond the end of the lever 16 which rides in the notch 19 in the bar 4. This pin rides in the slot 139 in the angle-plate 15. When the lever 16 has pushed the bar 4 to its forward limit where the mechanism is in high, the lever 16 must still travel its usual stroke. Accordingly, the pin 138 engages the upwardly inclined portion 140 of the slot which lifts the lever 16 out of the notch 19 in the bar 4 and allows the lever 16 to make a full stroke without any effect on the bar 4. The pin rides up into the horizontal portion 141 of the slot and comes to rest against the stop 142 on the bar 4.

When the pedal is again pressed, the pawls 56 and 55 successively throw the mechanism into neutral and intermediate, the hooks 58 and 57 successively engaging ratchet pins 37 and 36 to rotate the turret 180°, bringing the stud 28 rearwardly thus shoving the pitman 20 and the lever 16 rearwardly, whereby the bar 4 is moved to the rear end of the slot 2. Upon pressing the pedal a full stroke, the stud 28 moves forwardly and causes the bar 4 to move to the forward end of the slot, thus putting the mechanism again into high. As long as the selector 97 remains as in Fig. 18 and the pointer 116 remains at the indication 118, successive full strokes of the pedal will shift the mechanism back and forth between high and intermediate only.

In order to shift from intermediate to low, the pointer 116 is moved from the indication 118 to the indication 122, which slides the selector 97 to its right hand limit, as shown in Fig. 7. When the selector 97 is so slid, the rest 136 leaves the lug 126, allowing the lever 123 to shift its fulcrum to the pin 130 which rides on the forward edge of the plate 77. As the fulcrum is between the pin 129 and the pin 75, the spring 95 causes the lever 123 to turn slightly clockwise, the slot 127 in the lever 123 rocking the lever 71 slightly clockwise. The lever 71 cannot rock a full stroke because the locking bar 69 is against the edge of the angle plate 10, but the spring 95 causing a yielding pressure on the bar 69, which will move it into the notch 67 when the bar 4 moves forwardly to its central position which will occur when the pedal is next depressed sufficiently to cause the pawl 56 to rotate the turret another 90°, the bar 4 moving forwardly and placing the notch 67 opposite the locking bar 69, whereupon the latter snaps into that notch owing to the tension of the spring 95.

At this instant the parts shown on Fig. 7 are as indicated therein. When the stroke of the pedal is completed, the pawl 55 rotates the turret causing the stud 128 to push the pitman 20 and the lever 16 forwardly, the latter turning in the notch 19 as a pivotal point. The bar 7 being free is moved forwardly to the forward end of the slot 3. The apparatus is now in low gear.

If the pedal is now pushed forwardly the hook 58 will rotate the turret to bring the stud 28 up so as to stand at the left of the stud 27, so that the mechanism is in neutral as it always is when the studs are arranged transversely of the pitman, as in Figs. 4 and 10. When the pedal is pressed further to its limit, the hook 57 rotates the turret 90° to cause the stud 28 to move the pitman 20, the lever 16 and the bar 7 rearwardly with its shifting fork 8, whereupon the mechanism is shifted into reverse. As long as the pedal is successively pressed to its limit, the hooks will rotate the turret by steps causing the stud 28 through the pitman 20 and the lever 16 to alternately throw the mechanism into low and reverse. In order to set the mechanism in neutral, the pedal is pushed part-way down to cause the hook 58 to rotate the turret so as to bring the studs 27 and 28 transversely of the pitman. Obviously, the pitman moves forwardly and causes the shifting bar 7 and its fork 8 to move to their middle or neutral position.

In order to set the mechanism in what I call independent low, the pointer 116 is moved to the indication 119 which causes the selector 97 to move to the right until the pin 82 is on the rest 102, the pin 83 remaining at the face of the inclination 143 which connects the clearance 101 and the rest 102.

The lever 79 is therefore inclined to the right and the pitman is also centered over the stud 28 which stands at the right of the stud 27. The lever 79 was moved rearwardly slightly by the action of the inclination 143. The pin 82 now becomes the fulcrum of this lever in place of the pin 81. The overthrow rod 89 under the action of the spring 95 holds the lever 79 to the right because the rod acts on the lever at the right of its present fulcrum 82.

It is to be noted that the operation of the mechanism so far described a complete rotation of the turret causes the pin 87 on the end 96 of the pitman to travel in a complete circular path. The pin is extended up above the lever 79 and travels in the circular path 145 in the lower face of the plate 7. Diametrically-opposite sides of the path 145 are connected by the cross-over or connector path 146 which is transverse of the pitman to permit the pin 87 to travel freely one way or the other through the same, at which time the mechanism is in neutral.

Figure 11:
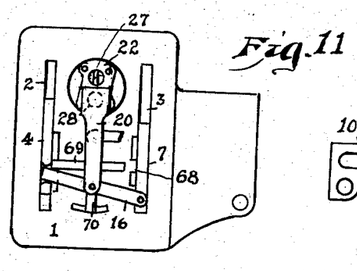
Fig. 11 is a diagrammatic view showing the parts on the upper face of the base 1 in low gear.
Figure 12:
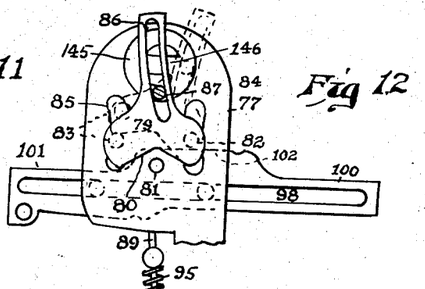
Fig. 12 is a bottom plan view of the plate 77 with the parts thereon positioned to correspond with the position of the parts in Fig. 11.

If the pedal is now pressed, the pawl 55 engages the ratchet pin 34 and rotates the turret 90°. The stud 28 is moved by the pawl 55 forwardly or arcuately to the right 90°, causing the shifting bar 7 to be moved to its forward limit or into low, as shown in Fig. 11, and the parts are now as shown in Figs. 11 and 12. The lever 79 was rocked to the left as the pin moved rearwardly as just described, causing the pin 83 to be lifted above the clearance 101. The lever 79 is substantially in its central position as shown in full lines in Fig. 12 with the pin 87 in its forward position. In case it is desired to throw the mechanism into neutral, it can be done merely by pressing the pedal sufficiently to cause the pawl 56 to turn the turret 22 90°, and bring both the studs 27 and 28 into alinement with the groove 132 in the pitman. During this movement the pitman was moved rearwardly in the path 145, or arcuately to the right on Fig. 12, which shows the lower faces of the parts thereon. As the pin 87 travels out in the path 145, it swings the lever 79 to the left (or right on Fig. 12). Finally the pin 87 comes into line with the cross-over path 146 whereupon this lever quickly snaps to the right (left on Fig. 12) under the influence of the overthrow spring 95 which has been compressed as the lever swung on its pin or fulcrum 82, the lever taking the position shown in dotted lines just before it is snapped back to the right. The movement of the pin 87 to the right moved the end 96 of the pitman from cooperation with the stud 28 into cooperation with the stud 27 which now has the position occupied by the stud 28 before the pedal was actuated the last time. The mechanism is now in neutral. The next or further operation of the pedal will duplicate the sequence of steps just described, the pitman working with the studs 27 and 28 alternately. As these studs take the same paths, it follows that the sequence of steps taken will be the same in either case.

To set the mechanism into what I call independent reverse, in which the operation of the pedal can effect nothing except shifting into reverse and neutral, the pointer 116 is moved to the indication 121 which shoves the selector to the left so that the pin 83 is on the rest 102 and the pin 82 is above the clearance 100 at the base of the incline 144 which connects the clearance 100 and the rest 102. The lever 79 is still off the pin 82 and has the pin 83 as its fulcrum. The lever 79 is inclined to the left as the overthrow spring 95 is exerting its pull thereon at the left of its fulcrum pin 83.

Figure 13:
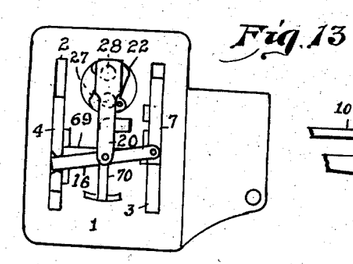
Fig. 13 is a diagrammatic view of the parts carried by the base 1 in reverse gear.
Figure 14:
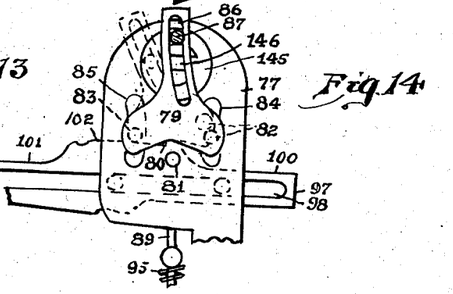
Fig. 14 is a bottom plan view of the plate 77 and the mechanism thereon in the position they assume in connection with the parts as shown in Fig. 13.
Figure 15:
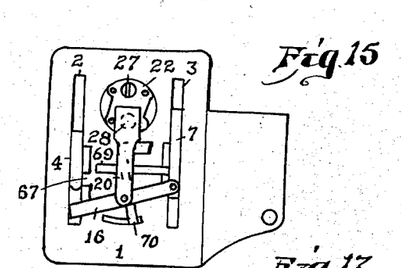
Fig. 15 is a diagrammatic view of the parts carried by the base 1 positioned as they would be in high gear.
Figure 16:
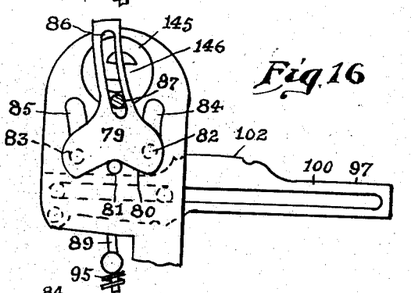
Fig. 16 is a bottom plan view of the plate 77 and the mechanism carried thereby, the position of the parts on Fig. 16 corresponding to those on Fig. 15.
Figure 17:
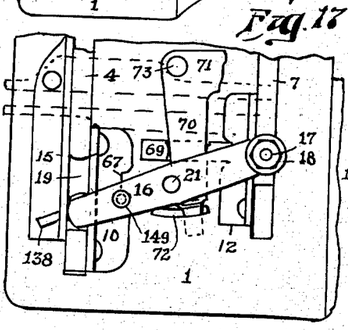
Fig. 17 is a fragmentary view showing the relative positions of the parts with the mechanism in high gear.

If the pedal is now depressed, the pitman which embraces the left-hand stud or crank-pin will move rearwardly, causing the lever 16 to pull the shifting bar 7 to its rear limit as shown in Fig. 13 which shows the position of the parts shown thereon. Fig. 14 shows the position of the under parts therein corresponding to the position of cooperating parts in Fig. 13. The pin 87 is now at its rearmost position and has moved the lever 79 to its central position as shown in full lines. The lever turning on the pin 83 has caused the pin 82 to be lifted and the spring 95 to be compressed further. If now the pedal be again depressed, the turret will be turned 90° by the pawl 56. The pin 87 will move forwardly and clockwise until the pin crosses to the left in the cross-over path 146, as shown in dotted lines in Fig. 14, whereupon the lever 79 snaps to the right, the pin 87 traveling through the path 146. At that time the pitman left the stud which moved it forwardly and swung to the right and embraced the other stud. The mechanism is now in neutral. Every time the pedal is compressed the mechanism will be successively thrown into reverse and neutral only.

Figure 19:
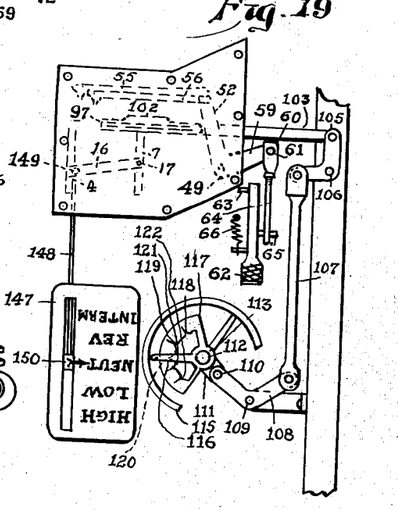
Fig. 19 shows a portion of the mechanism including the indicating mechanism for the selector. This view also shows the pedal connections for shifting the gears. This view also has an indicator showing the operator in what gear the mechanism is.

On Fig. 19, I show the indicator 147 having the legend, "high," "low," "neut," "rev," and "interm," the last three items meaning respectively neutral, reverse, and intermediate. 148 is a cable having one end attached to the pin 149 on the lever 16 and the other end to the pointer 150 arranged to travel along the said items of the legend. When the lever is as in Fig. 4, the mechanism is in neutral and the lever is in its central position. Accordingly, the length of the cable 148 is such that the pointer 150 stands at the item, "neut," as shown on Fig. 19. When the mechanism is in high, the bar 4 is at the forward end of the slot 2, which pushes the cable 148 forwardly so that the pointer 150 stands at "high." When the bar 4 is at the rear end of the slot 2, the mechanism is in intermediate and the cable 148 is pulled rearwardly, causing the pointer 150 to stand at "interm." The pin 149 being nearer to the bar 4 than to the bar 7 has a longer travel when the bar 4 is actuated to secure high and intermediate than it has when the bar 7 is actuated to secure low and reverse. In the former case the lever 16 rocks on the pivot 17 and in the latter case in the notch 19. Accordingly, when the bar 7 is shifted to the forward end of the slot 3, the mechanism is in low and the pointer 150 points to "low" which is between "high" and "neut." When the bar 7 is shifted to the rear end of the slot 3, the mechanism is in reverse and the pointer 150 points to "rev" which is between "neut" and "interm."

When the bars 4 and 7 are in their intermediate positions at which the mechanism is in neutral, a full stroke of the pedal will throw the mechanism into a predetermined gear setting, the pawl 56 moving idly while the pawl 55 rotates the turret 90°. When either bar 4 or 7 is at its limit, which means that the mechanism is set in one of its settings, a full stroke of the pedal causes the setting to be shifted to another setting. During this shift, the pawl 56 throws the mechanism into neutral while the pawl 55 continues the shift to effect the new gear setting.

The operation of the mechanism has been described with the turret as in Figs. 4 and 10, that is, with the ratchet pins 34 and 35 positioned rearwardly of the pins 36 and 37. It is readily seen that the operation would be the same if it had started with the pins 36 and 37 in the positions of the pins 34 and 35. However, the pitman 20 would have cooperated with the stud 27 instead of the stud 28.

The pawl 56 may be omitted and its function may be performed by the pawl 55. The pedal would be depressed twice to shift from one gear setting to another.

I claim:

1. In a gear-shifting mechanism for automobiles, a pair of longitudinally movable bars each carrying a gear-shifting fork, means for releasably locking one or the other of the two bars in its intermediate position, an operating lever having its ends respectively pivotally connected to the bars for moving the bars longitudinally, a pitman having one end pivoted to the lever intermediate of its ends, a rotary turret having diametrically-opposite crank-pins, means carried by the remaining end of the pitman for connection to one or the other of the crank-pins to give reciprocatory movement to the pitman, the operating lever and the unlocked bar, and means for rotating the turret to effect such reciprocatory movements said means operating upon each actuation thereof to rotate the turret through two successive steps.

2. In a gear-shifting mechanism for automobiles, a pair of longitudinally movable bars each carrying a gear-shifting fork, means for releasably locking one or the other of the two bars in its intermediate position, an operating lever having its ends respectively pivotally connected to the bars for moving the bars longitudinally, a pitman having one end pivoted to the lever intermediate of its ends, a rotary turret having diametrically-opposite crank-pins, means carried by the remaining end of the pitman for connection to one or the other of the crank-pins to give reciprocatory movement to the pitman, the operating lever and the unlocked bar, means for rotating the turret to effect such reciprocatory movements, said means operating upon each actuation thereof to rotate the turret through two successive steps, and means for selecting which crank-pin is to be connected to the pitman, whereby the direction of the reciprocations may be controlled.

3. In a gear-shifting mechanism for automobiles, a pair of longitudinally movable bars each carrying a gear-shifting fork, means for releasably locking one or the other of the two bars in its intermediate position, an operating lever having its ends respectively pivotally connected to the bars for moving the bars longitudinally, a pitman having one end pivoted to the lever intermediate of its ends, a rotary turret having diametrically-opposite crank-pins, means carried by the remaining end of the pitman for connection to one or the other of the crank-pins to give reciprocatory movement to the pitman, the operating lever and the unlocked bar, and means for rotating the turret to effect such reciprocatory movements, said means operating upon each actuation thereof to rotate the turret through two successive steps, and means for selecting which crank-pin is to be connected to the pitman, whereby the direction of the reciprocations may be controlled, and whereby the pitman may interlock with both crank-pins to prevent the rotation of the turret when the bars are in their intermediate positions.

4. In a gear shifting mechanism, the combination with a pair of fork members, one of said members being arranged to mesh the reverse gears or the low gears and the other member arranged to mesh the intermediate gears or the high gears of the mechanism and means for locking one of said fork members against movement, of an operating lever arranged to move and having its ends in direct pivotal connection with the fork members, and clutch-controlled means for moving the unlocked forked member by a complete forward movement of the clutch pedal to shift from one gear into the next gear.

5. In a gear shifting mechanism, the combination with a pair of fork members, one of said members being arranged to mesh the reverse gears or the low gears and the other member arranged to mesh the intermediate gears or the high gears of the mechanism and means for locking one of the said fork members against movement, of means for selecting the fork member to be locked, an operating lever arranged to move and having its ends in direct pivotal connection with the fork members, and clutch-controlled means for moving the unlocked forked member by a complete forward movement of the clutch pedal to shift from one gear into the next gear.

6. In a gear shifting mechanism, the combination with a pair of fork members, one of said members being arranged to mesh the reverse gears or the low gears and the other member arranged to mesh the intermediate gears or the high gears of the mechanism and means for locking one of said fork members against movement, of an operating lever arranged to move and having its ends in direct pivotal connection with the fork members, and a clutch-controlled pitman pivotally connected to the lever intermediate of its ends for moving the unlocked forked member by a complete forward movement of the clutch pedal to shift from one gear into the next gear.

7. In a gear shifting mechanism, the combination with a pair of fork members arranged to shift the gears in the mechanism, of an operating lever having its ends directly pivotally connected to the fork members for imparting motion thereto, a clutch-controlled pitman having one end pivoted to the lever intermediate of its ends for selectively moving either forked member by a single movement of the clutch pedal from one gear into the next gear, by operation of the clutch pedal in one direction to move one of said forked members out of one gear into neutral and by continued movement in the same direction into another gear, and selector means arranged to control the pitman for selecting the desired gear to be shifted by either fork member.

8. In a speed control device for automobiles, gear shifting mechanism, a rotary turret, a unitary member connecting the turret and the gear shifting mechanism for operating the latter, and means effective by a single continuous movement in one direction to rotate the turret and actuate said unitary member to shift from one gear into the next gear.

9. In a speed control device for automobiles, gear shifting mechanism, means comprising a turret having a single member for controlling the actuation of said mechanism, and means effective by a single continuous movement in one direction to operate said controlling means to effect actuation of the gear shifting mechanism to shift from one gear into the next gear.

FRANK P. LACKINGER.